US012564299B2

(12) United States Patent
Lv et al.

(10) Patent No.: US 12,564,299 B2
(45) Date of Patent: Mar. 3, 2026

(54) TOILET ROTATING SHAFT CONNECTION STRUCTURE

(71) Applicant: Xiamen Beewill Sanitary Co., Ltd., Xiamen (CN)

(72) Inventors: Yonglong Lv, Xiamen (CN); Shisong Ren, Xiamen (CN)

(73) Assignee: Xiamen Beewill Sanitary Co., Ltd., Xiamen (CN)

( * ) Notice: Subject to any disclaimer, the term of this patent is extended or adjusted under 35 U.S.C. 154(b) by 132 days.

(21) Appl. No.: 18/772,110

(22) Filed: Jul. 13, 2024

(65) Prior Publication Data

US 2024/0366044 A1 Nov. 7, 2024

(30) Foreign Application Priority Data

May 11, 2024 (CN) ........................ 202410586155.1

(51) Int. Cl.
*A47K 13/12* (2006.01)
*H01R 39/64* (2006.01)

(52) U.S. Cl.
CPC ............. *A47K 13/12* (2013.01); *H01R 39/64* (2013.01)

(58) Field of Classification Search
CPC ........ A47K 13/04; A47K 13/10; A47K 13/12; H01R 39/64; H01R 39/643
USPC ....................... 4/236, 240, 246.1, 246.2, 248
See application file for complete search history.

(56) References Cited

U.S. PATENT DOCUMENTS 1,973,234 A * 9/1934 Tsavaris ............... H01R 39/643
2024/0041273 A1 2/2024 Yan et al.

FOREIGN PATENT DOCUMENTS

DE 112016003751 B4 * 12/2021 ............. A47K 13/12
EP 4094653 A1 11/2022
EP 4094654 A1 11/2022
WO WO-2004075708 A1 * 9/2004 ............. A47K 13/12

* cited by examiner

*Primary Examiner* — Tuan N Nguyen

(57) ABSTRACT

The present invention provides a toilet rotating shaft connection structure, including: an insertion shaft and a hinge, wherein the insertion shaft is mounted on a movement cover, and the insertion shaft is provided with at least one first electrical conductor; and the hinge is provided with a shaft sleeve and a first rotating shaft, wherein the first rotating shaft is provided with at least one second electrical conductor; and the shaft sleeve is provided with a first connection hole and at least one third electrical conductor, the first connection hole can sleeve the insertion shaft so that the third electrical conductor abuts against the second electrical conductor and the first electrical conductor, and the second electrical conductor maintains abutment against the third electrical conductor when the first rotating shaft drives the second electrical conductor to rotate.

10 Claims, 10 Drawing Sheets

TOILET ROTATING SHAFT CONNECTION STRUCTURE

CROSS-REFERENCE TO RELATED APPLICATIONS

This application claims the benefit of priority from Chinese Patent Application No. 202410586155.1, filed on May 11, 2024. The content of the aforementioned application, including any intervening amendments thereto, is incorporated herein by reference in its entirety.

TECHNICAL FIELD

The present invention relates to the technical field of bathrooms, in particular to a toilet rotating shaft connection structure.

BACKGROUND

An intelligent toilet has additional functions of "flushing", "seat insulation", "warm air drying", "deodorizing", "induction flushing", "lighting", etc. on the basis of traditional toilets, and these functions require electrification to achieve. Conventional intelligent toilets are typically externally connected with a power source from a seat or a movement cover, which is not only prone to potential safety hazards, but also has cluttered wiring and is not beautiful.

In the related art, wires are used to connect a seat to an electric control portion in a movement cover, not only the wiring is troublesome and the wires are easily damaged when the seat is turned over for a long period of time, but also the movement cover needs to be equipped with additional wiring holes for the sake of beauty, resulting in an increased cost. Therefore, it is necessary to improve a toilet rotating shaft connection structure.

SUMMARY

The present invention aims to solve one of the technical problems in the above technology at least to some extent. To this end, an object of the present invention is to provide a toilet rotating shaft connection structure that integrates the electrical connection function and the mechanical connection function, is reliable in connection, and has a long service life.

In order to achieve the above object, the present invention provides a toilet rotating shaft connection structure, including: an insertion shaft and a hinge, wherein the insertion shaft is mounted on a movement cover, and the insertion shaft is provided with at least one first electrical conductor in an axial direction thereof; and the hinge is provided with a shaft sleeve and a first rotating shaft, wherein the first rotating shaft is provided with at least one second electrical conductor outwardly along an axis thereof, and the first rotating shaft can drive the second electrical conductor to synchronously rotate; and the shaft sleeve is provided with a first connection hole and at least one third electrical conductor, the first connection hole can sleeve the insertion shaft so that the third electrical conductor abuts against the second electrical conductor and the first electrical conductor, and the second electrical conductor maintains abutment against the third electrical conductor when the first rotating shaft drives the second electrical conductor to rotate.

According to the toilet rotating shaft connection structure proposed by the present invention, the insertion shaft cooperates with a hole shaft of the first connection hole of the hinge, so that the first electrical conductor on the insertion shaft and the second electrical conductor of the first rotating shaft synchronously abut against the third electrical conductor, whereby the first rotating shaft is electrically connected to the insertion shaft, and the mechanical connection of the first rotating shaft to the insertion shaft is achieved synchronously, when the first rotating shaft is rotated, the first rotating shaft drives the second electrical conductor to synchronously rotate, and the second electrical conductor is always kept in abutment with the third electrical conductor, thereby facilitating the connection of an electric appliance on a seat with an electric control portion under the movement cover. The toilet rotating shaft connection structure integrates the electric connection function and the mechanical connection function, is reliable in connection, and has a long service life.

In addition, the toilet rotating shaft connection structure proposed according to the above embodiment of the present invention may also have the following additional technical features:

optionally, the third electrical conductor elastically abuts against the second electrical conductor and/or the first electrical conductor.

Further, the third electrical conductor includes two abutting members, and the two abutting members elastically abut against the first electrical conductor and the second electrical conductor in one-to-one correspondence.

Further, the third electrical conductor further includes a hollow connecting column, and two abutting members are arranged at both ends of the connecting column, and the two abutting members are arranged at both ends of the connecting column in one-to-one correspondence, and the two abutting members are elastically and telescopically arranged.

Further, each abutting member is a ball.

Optionally, the shaft sleeve is provided with a second connection hole, the second connection hole penetrates from an end surface of the shaft sleeve to the first connection hole, and the third electrical conductor is disposed in the second connection hole in a penetrating manner.

Optionally, the first rotating shaft defines a mounting groove, and the second electrical conductor is mounted in the mounting groove.

Optionally, the hinge further includes a connecting member, the connecting member is connected to the seat, the first rotating shaft is detachably connected to the connecting member such that the first rotating shaft rotates synchronously with the connecting member, a wiring space is formed between the first rotating shaft and the connecting member, and a wire of an electric appliance of the seat is connected to the second electrical conductor through the wiring space.

Further, the second electrical conductor has a connection portion, and the connection portion is located in the wiring space.

Optionally, at least two first electrical conductors are provided, the first electrical conductors are sleeved layer by layer for coordination on the insertion shaft, and an insulating member is disposed between adjacent first electrical conductors.

Figure 1:
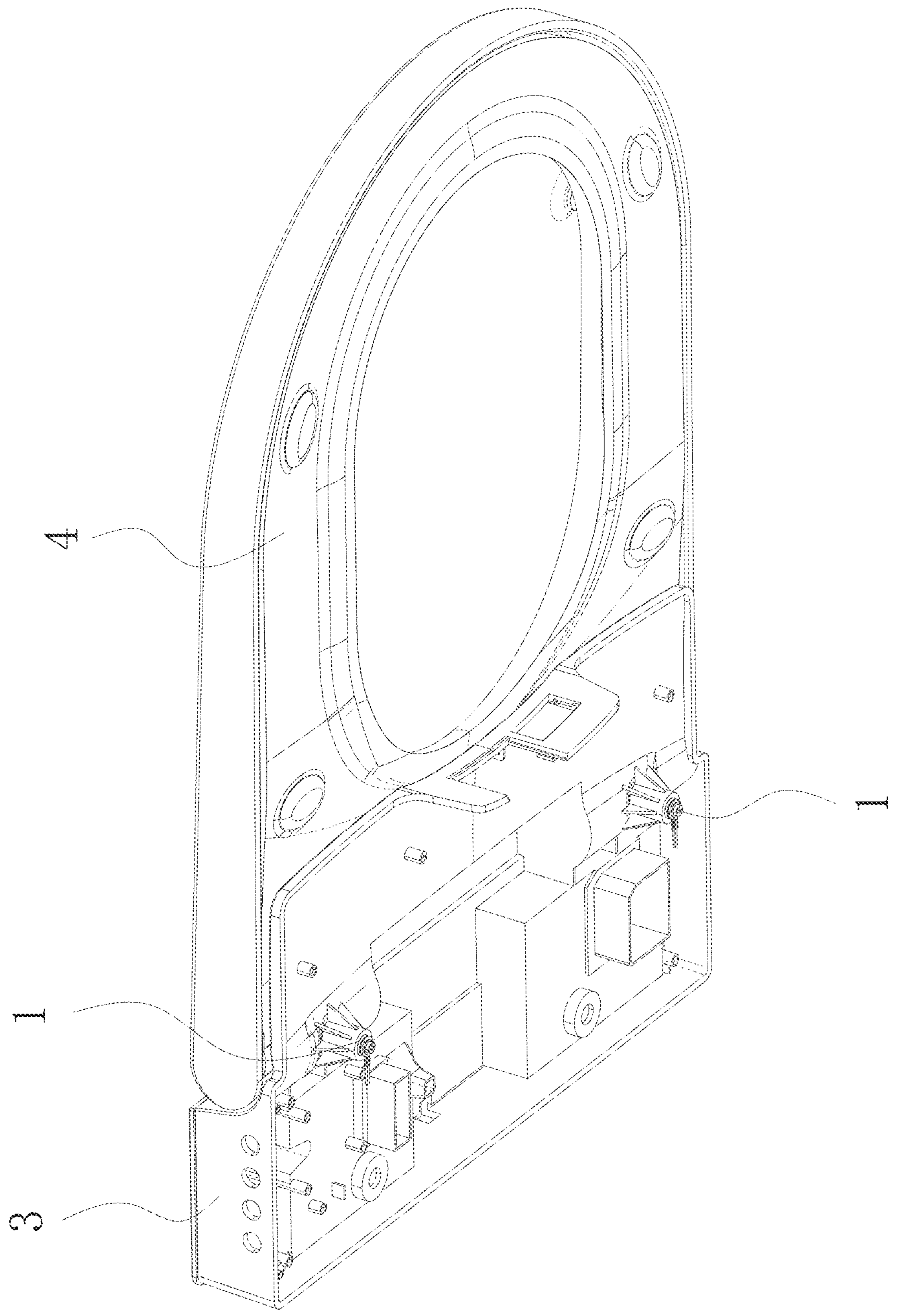
FIG. 1 is a structural schematic diagram of a toilet rotating shaft connection structure, a movement cover and a seat in an assembled state according to an embodiment of the present invention.

DESCRIPTION OF REFERENCE NUMERALS insertion shaft 1, first electrical conductor 11, insulating member 12, damping member 13, conductive screw 14, and lead wire 15;

hinge 2, shaft sleeve 21, first connection hole 211, third electrical conductor 212, abutting member 2121, connecting column 2122, second connection hole 213, first rotating shaft 22, second electrical conductor 221, connection portion 2211, mounting groove 222, connecting member 23, and wiring space 24;

movement cover 3; and seat 4.

DETAILED DESCRIPTION

The embodiments of the present invention are described in detail below, and the examples of the embodiments are shown in the accompanying drawings, wherein throughout the same or similar reference numerals indicate the same or similar elements or elements having the same or similar function. The embodiments described below by referring to the accompanying drawings are exemplary, and are intended to be used for explaining the present invention, and cannot be understood as a limitation on the present invention.

In order to better understand the above technical solutions, exemplary embodiments of the present invention will be described in more detail below with reference to the accompanying drawings. Although the exemplary embodiments of the present invention are shown in the accompanying drawings, it should be understood that the present invention may be implemented in various forms and should not be limited by the embodiments set forth herein. On the contrary, these embodiments are provided to more thoroughly understand the present invention, and fully convey the scope of the present invention to those skilled in the art.

For a better understanding of the above technical solutions, the above technical solutions will be described in detail below in conjunction with the drawings and the specific embodiments.

Figure 2:
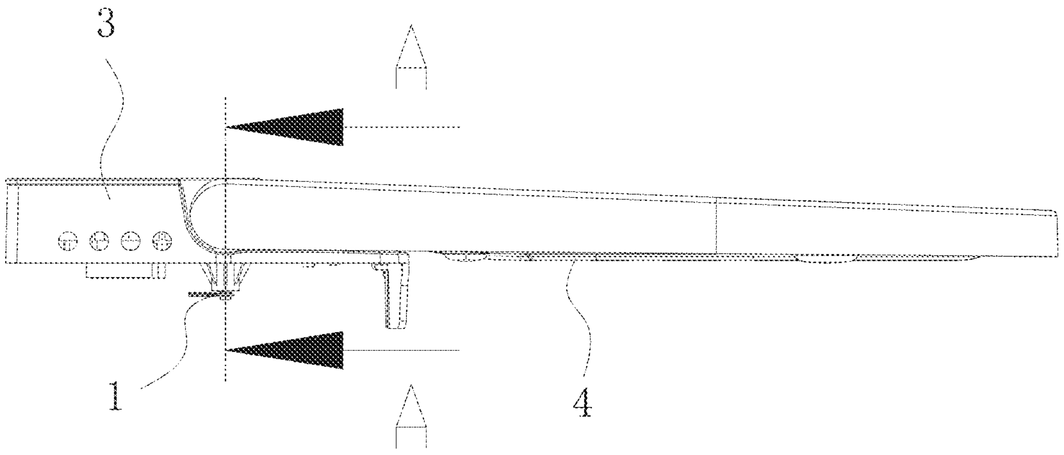
FIG. 2 is a structural schematic diagram of another perspective of FIG. 1.
Figure 3:
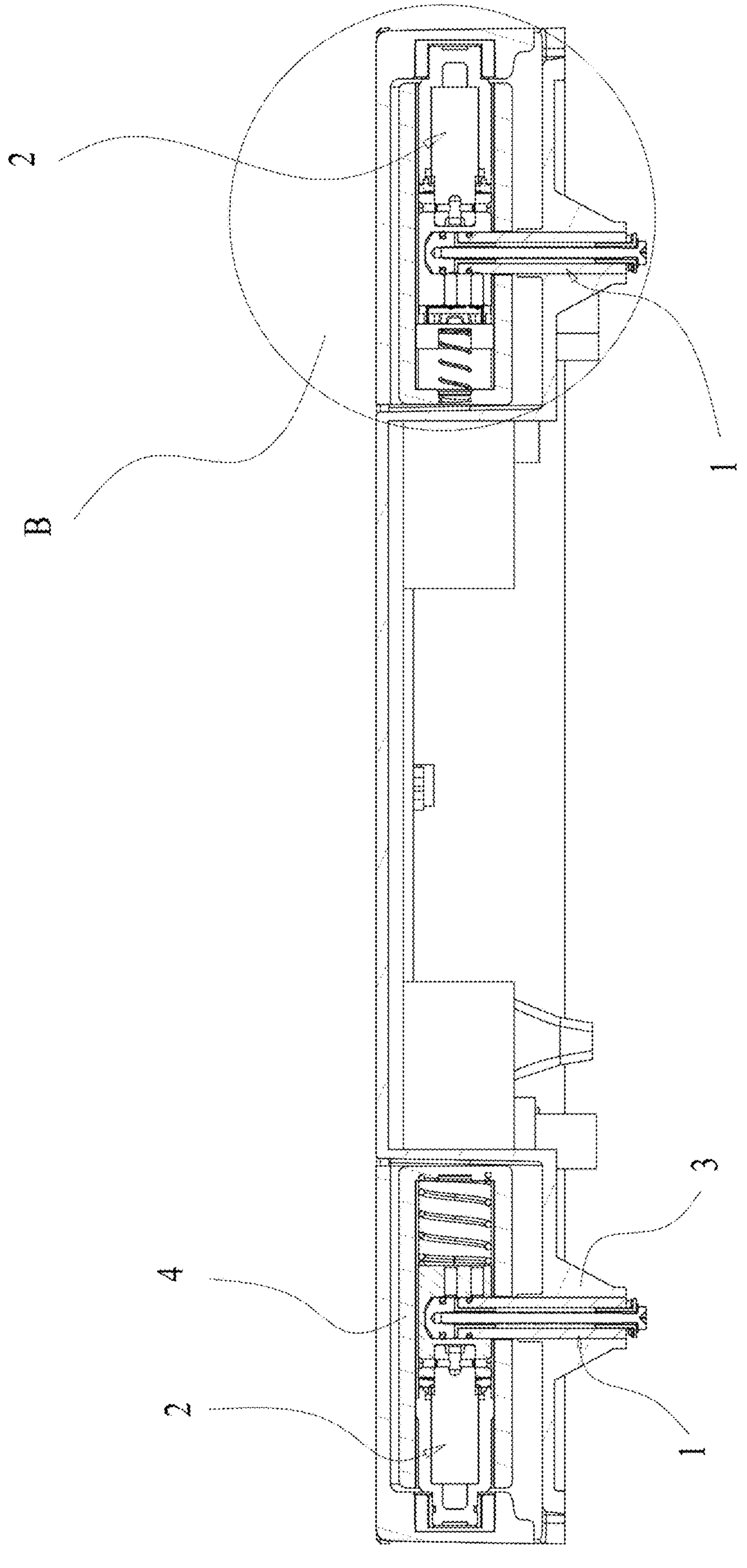
FIG. 3 is a cross-sectional view along A-A of FIG. 2.
Figure 4:
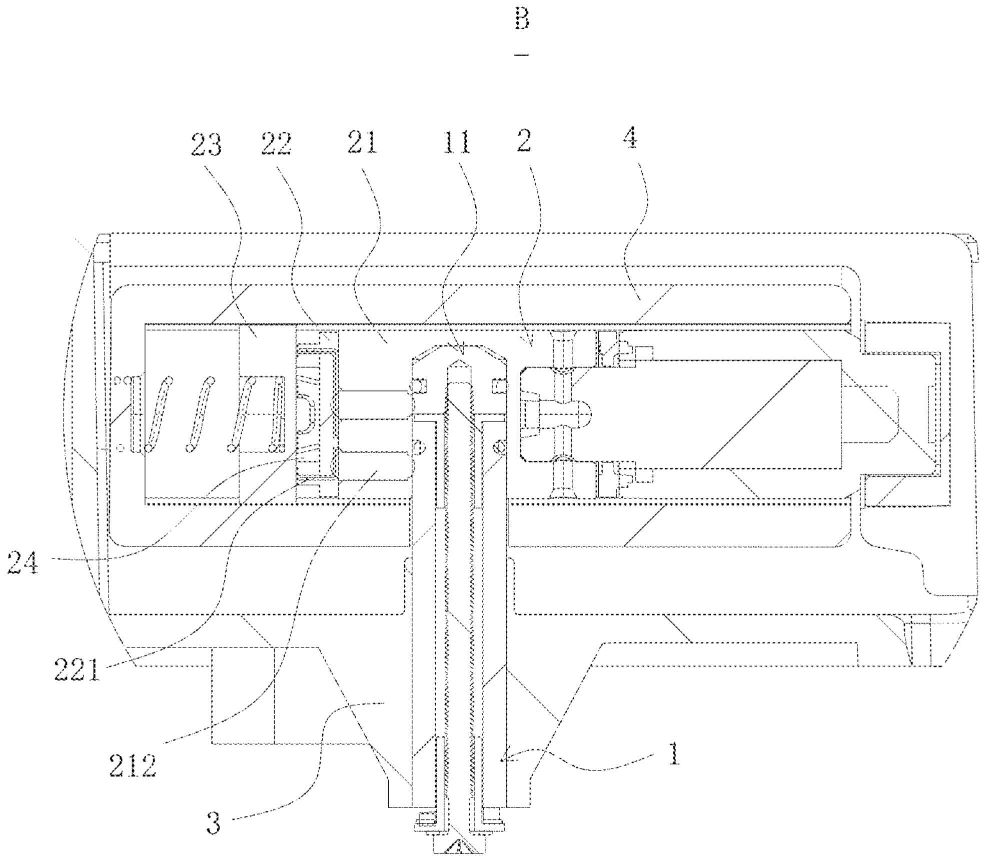
FIG. 4 is an enlarged view at B of FIG. 3.
Figure 5:
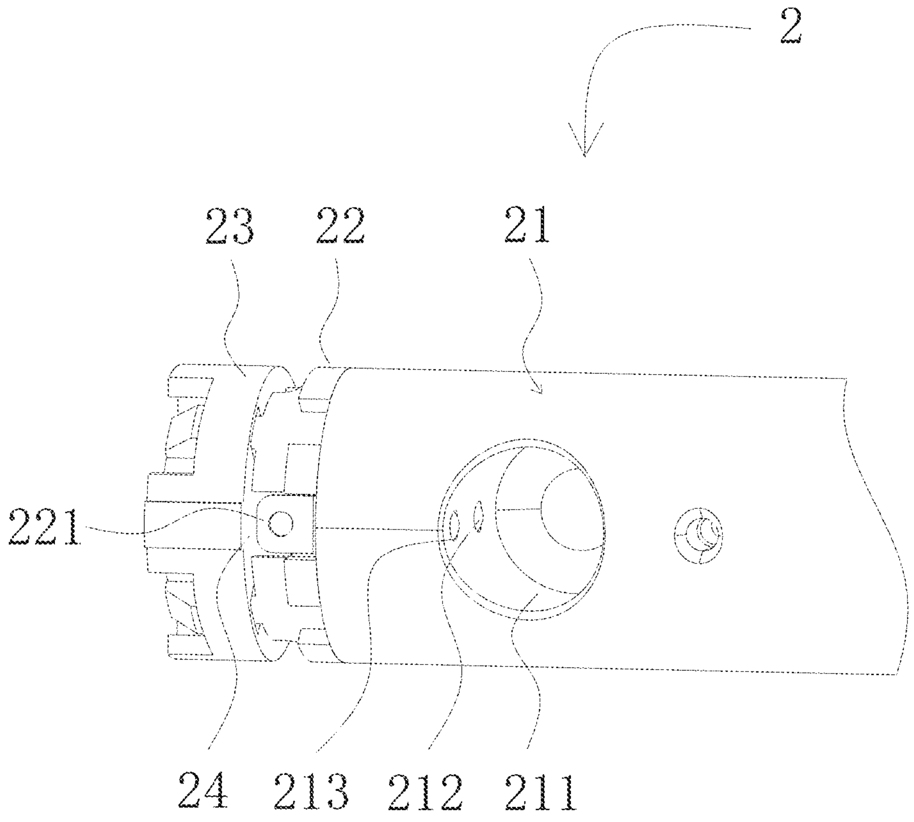
FIG. 5 is a structural schematic diagram of a hinge according to an embodiment of the present invention.
Figure 6:
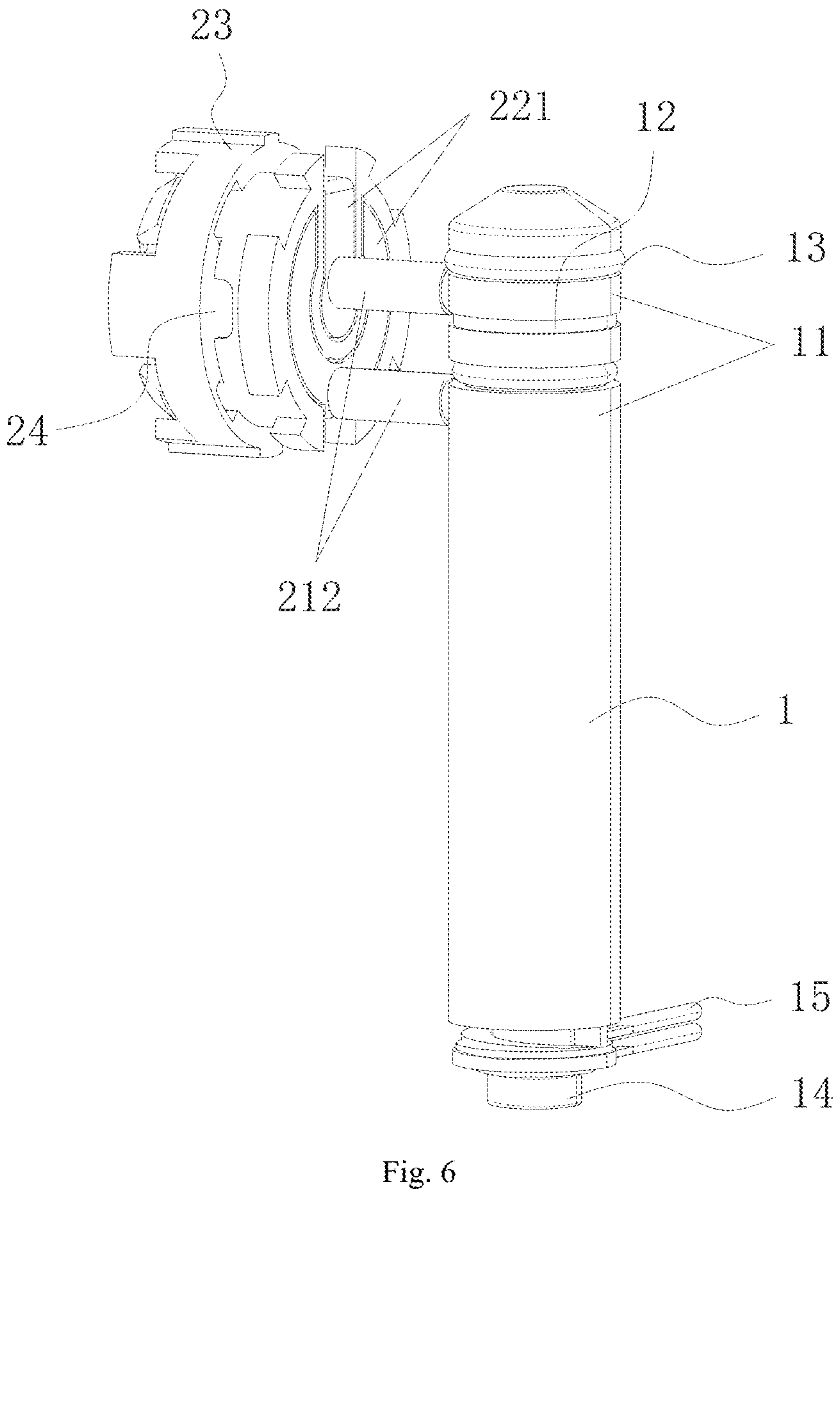
FIG. 6 is a structural schematic diagram of an insertion shaft and a portion of a hinge according to an embodiment of the present invention.
Figure 7:
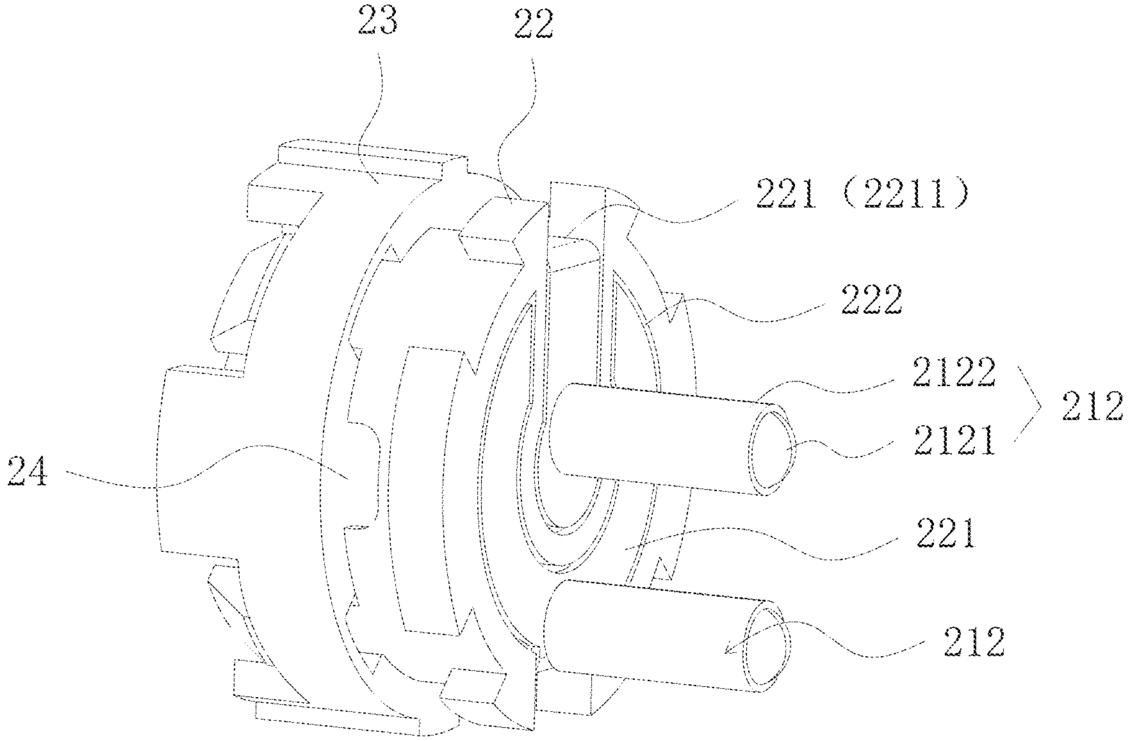
FIG. 7 is a structural schematic diagram of a first rotating shaft, a connecting member, and a third electrical conductor according to an embodiment of the present invention.
Figure 8:
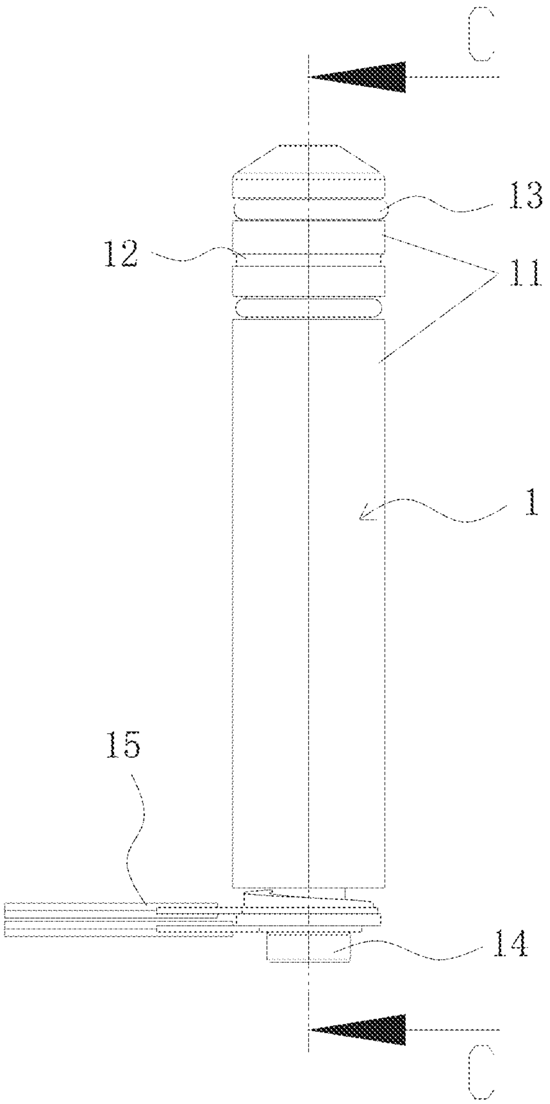
FIG. 8 is a structural schematic diagram of an insertion shaft of two first electrical conductors according to an embodiment of the present invention.
Figure 9:
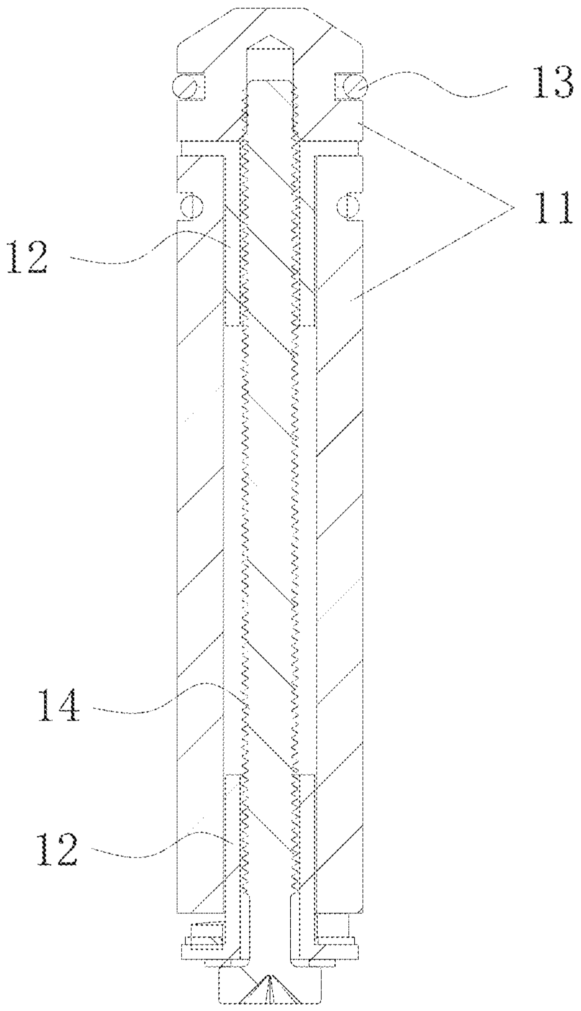
FIG. 9 is a cross-sectional view along C-C of FIG. 8.
Figure 10:
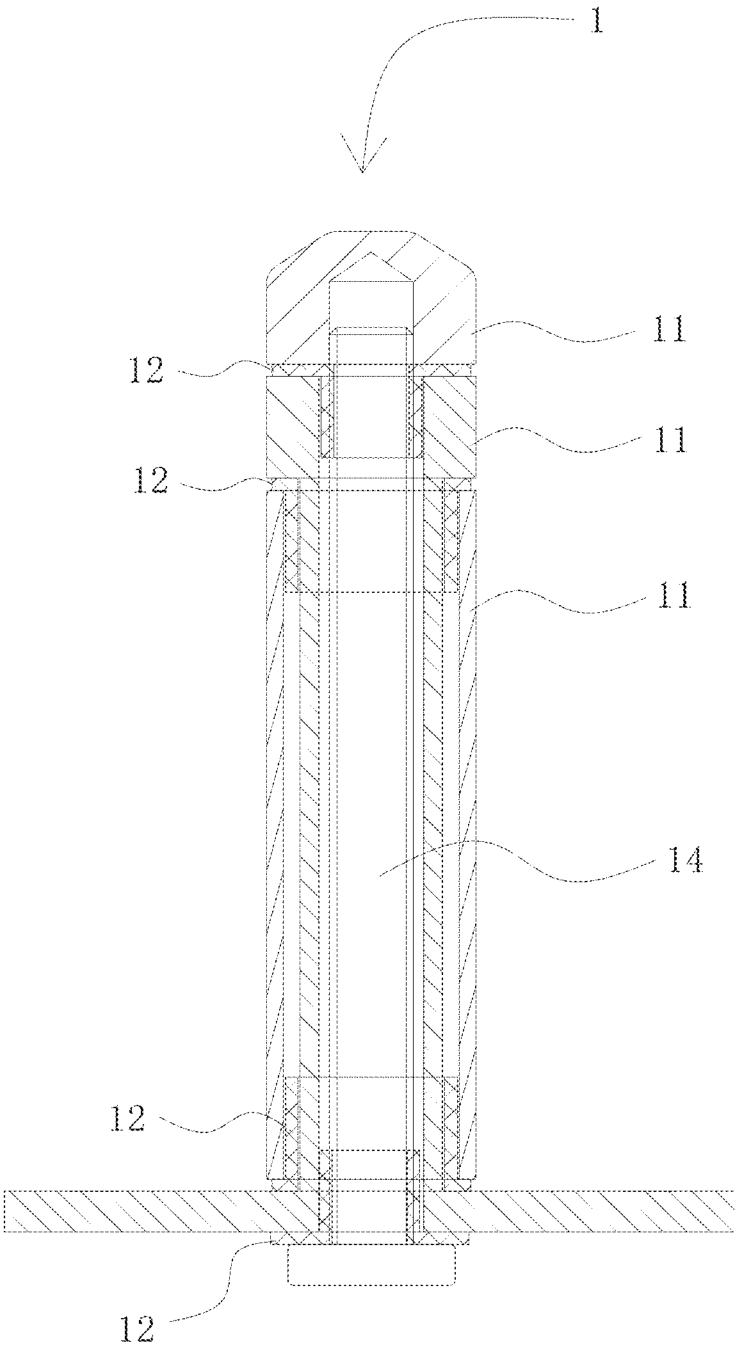
FIG. 10 is a structural schematic diagram of an insertion shaft of three first electrical conductors according to an embodiment of the present invention.

The implementation of a toilet rotating shaft connection structure according to an embodiment of the present invention will be described below in detail with reference to FIGS. 1 to 10.

The toilet rotating shaft connection structure according to the embodiment of the present invention includes an insertion shaft 1 and a hinge 2.

Specifically, the insertion shaft 1 is mounted on a movement cover 3, and the insertion shaft 1 is provided with at least one first electrical conductor 11 at intervals in an axial direction thereof; and the hinge 2 is provided with a shaft sleeve 21 and a first rotating shaft 22, wherein the first rotating shaft 22 is provided with at least one second electrical conductor 221 outwardly along an axis thereof, and the first rotating shaft 22 can drive the second electrical conductor 221 to synchronously rotate; and the shaft sleeve 21 is provided with a first connection hole 211 and at least one third electrical conductor 212, the first connection hole 211 can sleeve the insertion shaft 1 so that the third electrical conductor 212 abuts against the second electrical conductor 221 and the first electrical conductor 11 in one-to-one correspondence, and the second electrical conductor 221 maintains abutment against the third electrical conductor 212 when the first rotating shaft 22 drives the second electrical conductor 221 to rotate.

That is, an electric control portion under the movement cover 3 is electrically connected with the first electrical conductor 11 of the insertion shaft 1, a seat 4 may be connected to the first rotating shaft 22 to drive the first rotating shaft 22 to synchronously rotate, an electrical appliance of the seat 4 is electrically connected with the second electrical conductor 221, and when it is necessary to mount the seat 4 on the movement cover 3, the first connection hole 211 of the shaft sleeve 21 is aligned with the insertion shaft 1 to be inserted, thereby realizing a mechanical connection of the seat 4 to the movement cover 3, and at the same time, the third electrical conductor 212 on the shaft sleeve 21 is in contact with the first electrical conductor 11 and the second electrical conductor 221, so that the first electrical conductor 11 is electrically connected to the second electrical conductor 221, and when the seat 4 is turned over, the first electrical conductor 11 remains in static contact with the third electrical conductor 212, the second electrical conductor 221 maintains a rotational dynamic connection with the third electrical conductor 212 with the turning of the seat 4, so that the electrical appliance of the seat 4 is electrically connected to the electric control portion under the movement cover 3, so as to satisfy the power supply and signal transmission requirements of the electrical appliance of the seat 4, the connection is reliable, and the problems that conventional wire connection is easily damaged in a rotating joint and the wiring is troublesome are avoided.

Whereby, the insertion shaft 1 cooperates with a hole shaft of the first connection hole 211 of the hinge 2, so that the first electrical conductor 11 on the insertion shaft 1 and the second electrical conductor 221 of the first rotating shaft 22 synchronously abut against the third electrical conductor 212, so that the first rotating shaft 22 is electrically connected to the insertion shaft 1, and the mechanical connection of the first rotating shaft 22 to the insertion shaft 1 is achieved synchronously, when the seat 4 is turned over, the seat 4 drives the second electrical conductor 221 to synchronously rotate, and the second electrical conductor 221 is always kept in abutment with the third electrical conductor 212, thereby facilitating the connection of the electric appliance on the seat 4 with the electric control portion under the movement cover 3. The toilet rotating shaft connection structure integrates the electric connection function and the mechanical connection function, is reliable in connection, and has a long service life.

For holding the second electrical conductor 221 in abutment with the third electrical conductor 212 and the first electrical conductor 11, the third electrical conductor 212 elastically abuts against the second electrical conductor 221 and/or the first electrical conductor 11. It can be understood that the third electrical conductor 212 elastically abuts against the second electrical conductor 221 and/or the first electrical conductor 11 so that there is an elastic abutment force between the third electrical conductor 212 and the second electrical conductor 221 and/or the first electrical conductor 11, thereby guaranteeing the reliability of the abutment between the third electrical conductor 212 and the second electrical conductor 221 and the first electrical conductor 11. The third electrical conductor 212 may be an elastic electrical conductor such as a conductive spring, a bent elastic sheet, or the like. In addition, a spring may be connected to the second electrical conductor 221 so that the third electrical conductor 212 is in elastic contact with the second electrical conductor 221.

For the third electrical conductor 212, the third electrical conductor 212 includes two abutting members 2121 elastically abutting against the first electrical conductor 11 and the second electrical conductor 221 in one-to-one correspondence. It can be understood that since the third electrical conductor 212 is located between the first electrical conductor 11 and the second electrical conductor 221, the abutting members 2121 elastically abut against the first electrical conductor 11 and the second electrical conductor 221 in one-to-one correspondence, so that the contact between the third electrical conductor 212 and the first electrical conductor 11 and the second electrical conductor 221 can be made more reliable, and at the same time, it is convenient for the third electrical conductor 212 to have an elastic avoidance effect with the first electrical conductor 11 and the second electrical conductor 221 in the process of fit mounting of the first connection hole 211 and the insertion shaft 1 to facilitate assembly. Each abutting member 2121 may be disposed as an electrical conductor with a circular arc or chamfer to facilitate elastic avoidance during installation.

For the mounting of the abutting members 2121, the third electrical conductor 212 further includes a hollow connecting column 2122, the two abutting members 2121 are arranged at both ends of the connecting column 2122 in one-to-one correspondence, and the two abutting members 2121 can be elastically and telescopically arranged. It can be understood that by disposing the connecting column 2122, it is convenient to mount the abutting members 2121 inside the connecting column 2122, it is convenient for the abutting members 2121 to have an elastic telescopic function inside the connecting column 2122, so as to make elastic contact with the first electrical conductor 11 and the second electrical conductor 221, and at the same time, it is convenient for the abutting members 2121 and the connecting column 2122 to form a whole, and it is convenient to assemble with the shaft sleeve 21; the connecting column 2122 may be provided with a spring, one end of the spring abuts against one of the abutting members 2121 and the other end of the spring abuts against the other abutting member 2121, both ends of a hollow part of the connecting column 2122 may be provided in a necked shape so as to restrict the abutting members 2121 in the hollow part of the connecting column 2122, and the connecting column 2122 may be made of a conductive material or a non-conductive material.

For the shape of each abutting member 2121, each abutting member 2121 is a ball. It can be understood that by disposing the balls, it is convenient for the balls to roll during contact with the first electrical conductor 11 and the second electrical conductor 221, it is convenient to reduce a frictional force between the third electrical conductor 212 and the first electrical conductor 11 and the second electrical conductor 221, thereby avoiding losses or scratches caused by friction, while reducing losses or scratches caused by friction between the second electrical conductor 221 and the third electrical conductor 212 when the seat 4 is turned over.

For mounting of the third electrical conductor 212 and the shaft sleeve 21, the shaft sleeve 21 is provided with a second connection hole 213, the second connection hole 213 penetrates from an end surface of the shaft sleeve 21 to the first connection hole 211, and the third electrical conductor 212 is disposed in the second connection hole 213 in a penetrating manner. It can be understood that by disposing the second connection hole 213, it is convenient for the third electrical conductor 212 to be mounted in the second connection hole 213 while making the abutment of the third electrical conductor 212 with the first electrical conductor 11 and the second electrical conductor 221 more precise. The second connection hole 213 may be integrally formed in the shaft sleeve 21, a limiting step is disposed in the second connection hole 213, and the limiting step is disposed close to a position where the first connection hole 211 communicates with the second connection hole 213 to facilitate the limiting of the connecting column 2122, and a diameter of the position where the first connection hole 211 communicates with the second connection hole 213 is smaller than a diameter of each ball so that the ball partially extends out of the first connection hole 211 to be in contact with the first electrical conductor 11.

For mounting of the second electrical conductor 221, the first rotating shaft 22 defines a mounting groove 222 in which the second electrical conductor 221 is mounted. It can be understood that the mounting and limiting of the second electrical conductor 221 can be facilitated by disposing the mounting groove 222, so that the second electrical conductor 221 is more securely mounted on the first rotating shaft 22. The mounting groove 222 may be integrally formed in an end surface of the first rotating shaft 22, the second electrical conductor 221 in an innermost layer may be in a word shape, the second electrical conductor 221 in an outer layer may be in a circular arc shape, and the second electrical conductor 221 may be arranged in a fan shape, so as to save materials, and a plurality of second electrical conductors 221 are provided to meet power supply and signal transmission requirements of a plurality of electric appliances.

For the mounting of the first rotating shaft 22, the hinge 2 further includes a connecting member 23 connected with the seat 4, the first rotating shaft 22 is detachably connected to the connecting member 23 so that the first rotating shaft 22 rotates synchronously with the connecting member 23, a wiring space 24 is formed between the first rotating shaft 22 and the connecting member 23, and a wire of the electric appliance of the seat 4 is connected to the second electrical conductor 221 through the wiring space 24. It can be understood that the mounting of the first rotating shaft 22 is facilitated by the provision of the connecting member 23, thereby facilitating the connection of the wire of the electric appliance on the seat 4 to the second electrical conductor 221 through the wiring space 24. The first rotating shaft 22 and the connecting member 23 may be in a snap connection, and the seat 4 is provided with a wiring hole which is aligned with the wiring space 24.

For connection of the electric appliance of the seat 4 with the second electrical conductor 221, the second electrical conductor 221 has a connection portion 2211 which is located in the wiring space 24. It can be understood that by disposing the connection portion 2211, it is convenient that the wire of the electric appliance of the seat 4 is uniformly electrically connected to the second electrical conductor 221 through the wiring space 24, making the wiring more beautiful while having the functions of protecting an exposed portion of the wire and the connection of the wire to the second electrical conductor. The connection portion 2211 may extend from an outer circumferential surface of the first rotating shaft 22 to the wiring space 24, it is convenient to form a larger space for an operator to perform soldering or the like, and the connection portion 2211 may be extended directly from a back surface of the mounting groove 222 to the wiring space 24, the connection portion 2211 is formed by bending the second electrical conductor 221, and a hole is formed in the connection portion 2211 to facilitate soldering or locking the wire of the electric appliance and the connection portion 2211.

For the structure of the insertion shaft 1, at least two first electrical conductors 11 are provided, the first electrical conductors 11 are sleeved layer by layer for coordination on the insertion shaft 1, and an insulating member 12 is disposed between adjacent first electrical conductors 11. It can be understood that the plurality of the first electrical conductors 11 can be conveniently disposed on the insertion shaft 1 by sleeving the first electrical conductors 11 layer by layer for coordination, thereby facilitating meeting multiple-way power supply and signal transmission requirements, and by disposing the insulating members 12, insulation between the first electrical conductors 11 can be facilitated to avoid a short circuit. A top portion of the insertion shaft 1 can serve as one first electrical conductor 11, the remaining first electrical conductors 11 may sleeve the first electrical conductor 11 at the top layer by layer, the first electrical conductor 11 at the top is mounted on the movement cover 3 together with the remaining first electrical conductors 11 by means of conductive screws 14, each first electrical conductor 11 is led from the bottom to the electric control portion under the movement cover 3 by a lead wire 15, a damping member 13 may also be disposed on the insertion shaft 1, facilitating a damping fit of the first connection hole 211 with the insertion shaft 1, so that the seat 4 is connected with the movement cover 3, the damping member 13 may be a rubber ring, it is also possible to form the connection of the seat 4 to the movement cover 3 by cooperating a groove disposed in the existing insertion shaft with a projection on the shaft sleeve 21, each insulating member 12 may be in the shape of a hollow T shape, since the first electrical conductors 11 are sleeved for coordination, there is a certain clearance at the fit, disposing the insulating members 12 in the hollow T shape can facilitate sleeving of the insulating members 12 from the upper and lower ends of the first electrical conductors 11, insulation with adjacent first conductors 11 in a vertical direction can be formed, and insulation can be formed between the first electrical conductors 11 in inner and outer layers, and a fit clearance between the first electrical conductors 11 in the inner and outer layers can be eliminated, so that a more firm and well-integrated insertion shaft 1 can be formed, and at the same time, quick assembly of the insertion shaft 1 can be facilitated, and a plurality of wires can be arranged to meet the power supply and signal transmission requirements of a toilet cover or the seat 4.

In the description of the present invention, it needs to be understood that the terms “central,” “longitudinal,” “lateral,” “length,” “width,” “thickness,” “upper,” “lower,” “front,” “rear,” “left,” “right,” “vertical,” “horizontal,” “top,” “bottom,” “inner,” “outer,” “clockwise,” “counterclockwise,” and the like indicate an orientation or positional relationship based on the orientation or positional relationship shown in the drawings, are merely for ease of description of the present invention and simplification of the description, and are not intended to indicate or imply that the device or element referred to must have a particular orientation, and be constructed and operate in a particular orientation, and therefore should not be construed as a limitation of the present invention.

Furthermore, the terms “first” and “second” are used for descriptive purposes only and cannot be understood to indicate or imply relative importance or to implicitly specify the number of technical features indicated. Thus, features defined with “first” and “second” may explicitly or implicitly include one or more of such features. In the description of the present invention, “a plurality of” means two or more, unless expressly and specifically defined otherwise.

In the present invention, unless expressly specified and limited otherwise, the terms “mounted”, “connected”, “connection”, “fixed” and the like should be understood in a broad sense, e.g., it can be fixed connection or detachable connection, or integral formation; it can be mechanical connection or electrical connection; it can be may be direct connection or indirect connection through an intermediate medium, and it can be internal communication between two elements or an interaction relationship between two elements. The specific meaning of the above terms in the present invention can be understood by those of ordinary skill in the art based on specific circumstances.

In the present invention, unless expressly specified and limited otherwise, a first feature “above” or “below” a second feature may include that the first and second features are in direct contact or that the first and second features are not in direct contact but are in contact through another feature between the first and second features. Moreover, a first feature is “over,” “above,” and “on” a second feature, which includes that the first feature is directly above and obliquely above the second feature, or simply indicates that the first feature is at a level higher than the second feature. A first feature is “beneath,” “below,” and “under” a second feature, which includes the first feature is directly below and obliquely below the second feature, or simply indicates that the first feature is at a level less than the second feature.

In the description of this specification, the description of the reference terms “one embodiment”, “some embodiments”, “an example”, “a specific example”, “some examples”, and the like means that particular features, structures, materials, or characteristics described in connection with the embodiment or example are included in at least one embodiment or example of the present invention. In this specification, illustrative expressions of the above terms should not be understood as necessarily referring to the same embodiment or example. Furthermore, the particular features, structures, materials, or characteristics described may be combined in a suitable manner in any one or more embodiments or examples. In addition, different embodiments or examples described in this specification may be joined and combined by those skilled in the art.

Although the embodiments of the present invention have been shown and described above, it can be understood that the above embodiments are exemplary and cannot be construed as a limitation of the present invention, and that those of ordinary skill in the art may make changes, modifications, substitutions, and variations to the above embodiments within the scope of the present invention.

What is claimed is:

1. A toilet rotating shaft connection structure, characterized by comprising: an insertion shaft and a hinge, wherein the insertion shaft is mounted on a movement cover, and the insertion shaft is provided with at least one first electrical conductor in an axial direction thereof; and the hinge is provided with a shaft sleeve and a first rotating shaft, wherein the first rotating shaft is provided with at least one second electrical conductor outwardly along an axis thereof, and the first rotating shaft can drive the second electrical conductor to synchronously rotate; and the shaft sleeve is provided with a first connection hole and at least one third electrical conductor, the first connection hole can sleeve the insertion shaft so that the third electrical conductor abuts against the second electrical conductor and the first electrical conductor, and the second electrical conductor maintains abutment against the third electrical conductor when the first rotating shaft drives the second electrical conductor to rotate.

2. The toilet rotating shaft connection structure according to claim 1, characterized in that the third electrical conductor elastically abuts against the second electrical conductor and/or the first electrical conductor.

3. The toilet rotating shaft connection structure according to claim 2, characterized in that the third electrical conductor comprises two abutting members, and the two abutting members elastically abut against the first electrical conductor and the second electrical conductor in one-to-one correspondence.

4. The toilet rotating shaft connection structure according to claim 3, characterized in that the third electrical conductor further comprises a hollow connecting column, and the two abutting members are arranged at both ends of the connecting column in one-to-one correspondence, and the two abutting members are elastically and telescopically arranged.

5. The toilet rotating shaft connection structure according to claim 3, characterized in that each abutting member is a ball.

6. The toilet rotating shaft connection structure according to claim 1, characterized in that the shaft sleeve is provided with a second connection hole, the second connection hole penetrates from an end surface of the shaft sleeve to the first connection hole, and the third electrical conductor is disposed in the second connection hole in a penetrating manner.

7. The toilet rotating shaft connection structure according to claim 1, characterized in that the first rotating shaft defines a mounting groove, and the second electrical conductor is mounted in the mounting groove.

8. The toilet rotating shaft connection structure according to claim 1, characterized in that the hinge further comprises a connecting member, the connecting member is connected to a seat, the first rotating shaft is detachably connected to the connecting member such that the first rotating shaft rotates synchronously with the connecting member, a wiring space is formed between the first rotating shaft and the connecting member, and a wire of an electric appliance of the seat is connected to the second electrical conductor through the wiring space.

9. The toilet rotating shaft connection structure according to claim 8, characterized in that the second electrical conductor has a connection portion, and the connection portion is located in the wiring space.

10. The toilet rotating shaft connection structure according to claim 1, characterized in that at least two first electrical conductors are provided, the first electrical conductors are sleeved layer by layer for coordination on the insertion shaft, and an insulating member is disposed between adjacent first electrical conductors.

* * * * *